United States Patent Office 3,178,386
Patented Apr. 13, 1965

3,178,386
POLYPROPYLENE MODIFIED WITH PELARGONIC ACID ESTERS
Roy J. Hickam, Dayton, Ohio, assignor to General Motors Corporation, Detroit, Mich., a corporation of Delaware
No Drawing. Filed Sept. 11, 1961, Ser. No. 137,043
3 Claims. (Cl. 260—31.2)

This invention relates to a new composition of matter and is particularly concerned with a polypropylene compound having good low temperature properties.

Polypropylene is a very useful molding material which is compression or injection molded into any number of shapes and forms. In most instances, however, the use of polypropylene is limited to the production of articles that are not subjected to low temperatures since polypropylene while reasonably resistant to impact at room temperatures and above is extremely susceptible to fracture due to extreme brittleness at low temperatures.

The main object of the present invention is directed to a method for compounding polypropylene with a modifying material which improves the low temperature properties thereof without reducing its usefulness at elevated temperatures whereby the use of polypropylene may be greatly expanded and wherein satisfactory articles may be made for use at low temperatures.

In carrying out this object, I have found that additions of esters of pelargonic acid in varying quantities will modify the polypropylene and greatly improve its susceptibility to impact breakage at low temperatures. I have found that additions of an ester or esters of pelargonic acid in quantities ranging between 5% and 20% by weight greatly improve the condition with maximum improvement taking place in the range of from about 8% to 18%.

Specifically, I propose to use the esters of pelargonic acid produced by the reaction of the pelargonic acid and a mono-functional alcohol and specifically between pelargonic acid and an alcohol within the group including methyl through dodecyl alcohol.

Compounds made from mixtures of polypropylene and the pelargonic acid ester may be injection molded with high success. The compound may be further modified with coloring material so that the final article will have the desired appearance.

Tests have shown that various grades and types of polypropylene are all benefited by the addition and that the low temperature impact strength is improved over the polypropylene without the addition.

In the following table different grades of polypropylene, colored and natural, were used as a base material and the brittleness temperature of unmodified material and material modified with 10% addition of isodecyl pelargonate was tabulated. In each case, the part fractured on the next lower degree of temperature.

All samples were injection molded in a one ounce Watson Stillman molding machine from granules using a cylinder temperature of 425° F. The unmodified material was molded from granules as received while the modified material had the isodecyl pelargonate milled into the material on a two-roll rubber mill.

| | Brittleness Temp. of Unmodified Material | Brittleness Temp. after Modification with 10% Isodecyl Pelargonate |
|---|---|---|
| Sample A | Passed +8° F | Passed −4° F. |
| Sample B (Black) | Failed at Room Temp | Passed +10° F. |
| Sample C (Natural) | Passed +52° F | Passed −20° F. |
| Sample D (Red) | Passed +60° F | Passed −6° F. |
| Sample E (White) | Passed +64° F | Passed −12° F. |
| Sample F (Natural) | Passed +54° F | Passed −16° F. |
| Sample G (Gray) | Passed +20° F | Passed −44° F. |
| Sample H (Black) | Failed at Room Temp | Passed +18° F. |
| Sample I | ----do---- | Passed +24° F. |

It will be noted that in all cases the impact brittleness was greatly improved.

In determining the optimum quantity of the pelargonic acid ester to use as an addition, I utilized Sample E with various quantities of the pelargonic ester of isodecyl alcohol. The results are as follows:

| Percent Sample E | Percent Isodecyl Pelargonate | Tensile at Break | Percent Ultimate Elongation | Shore D Hardness | Thermal Expansion [1] | Brittleness Temp., ° F. |
|---|---|---|---|---|---|---|
| 100 | 0 | 5,350 | 10 | 70 | $0.6345 \times 10^{-4}$ | +64 |
| 95 | 5 | 4,680 | 20 | 68 | $0.8165 \times 10^{-4}$ | +20 |
| 90 | 10 | 3,910 | 120 | 67 | $0.9055 \times 10^{-4}$ | −12 |
| 85 | 15 | 3,060 | 75 | 62 | $0.9010 \times 10^{-4}$ | −12 |
| 80 | 20 | 2,510 | 30 | 62 | $0.9472 \times 10^{-4}$ | +6 |
| 75 | 25 | 2,110 | 25 | 56 | $0.9790 \times 10^{-4}$ | +42 |
| 70 | 30 | 1,150 | 15 | 47 | $0.6057 \times 10^{-4}$ | Rm. Temp. |

[1] Coefficient of linear thermal expansion per ° C. (avg.)

It will be noted from the above table that percentages between 8% to 18% yield the best results with a percentage of 10 being most useful both from point of improvement and economy. Twenty percent and above showed a retrogression in the improvement factor. All of the samples were tested on a Scott tensile tester and on a Scott impact brittleness tester (solenoid brittleness type) by standard ASTM procedures.

Similar results may be obtained when using any of the esters of pelargonic acid and mono-functional alcohol within the range noted, namely between methyl alcohol and dodecyl alcohol.

While the embodiments of the present invention as herein disclosed, constitute preferred forms, it is to be understood that other forms may be adopted.

What is claimed is as follows:

1. A molding compound suitable for compression, injection and extrusion molding operations consisting essentially of polypropylene modified with an ester of pelargonic acid wherein the ester is formed by reacting the acid with a mono-functional alcohol taken from the class consisting of alcohols from methyl to dodecyl in the homologous series thereof, said ester being present in quantities of from 5–20% by weight of the compound.

2. A molding compound for use in compression, injection and extrusion molding operations consisting essentially of polypropylene modified with the isodecyl ester of pelargonic acid, said ester being present in quantities of from 5–20% by weight of the compound.

3. A molding compound for use in compression, injection and extrusion molding operations consisting essentially of polypropylene modified with the isodecyl ester of pelargonic acid, said ester being present in quantities of 10% by weight of the compound.

References Cited by the Examiner

UNITED STATES PATENTS 2,628,249  2/53  Bruno _____ 260—410.9
2,967,164  1/61  Aries _____ 260—31.2

OTHER REFERENCES

J. Amer. Chem. Soc. vol. 66, pages 1494–7 (1944). (Copy in Scientific Library.)

ALEXANDER H. BRODMERKEL, *Primary Examiner.*
WILLIAM H. SHORT, MORRIS LIEBMAN, *Examiners.*